US009503669B2

(12) United States Patent
Weng et al.

(10) Patent No.: US 9,503,669 B2
(45) Date of Patent: Nov. 22, 2016

(54) SMART CONTROL DEVICE AND METHOD FOR CONTROLLING TELEVISION SET

(71) Applicant: HON HAI PRECISION INDUSTRY CO., LTD., New Taipei (TW)

(72) Inventors: Sheng-Feng Weng, New Taipei (TW); Chuan-Te Chan, New Taipei (TW); Wen-Chia Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/794,252

(22) Filed: Jul. 8, 2015

(65) Prior Publication Data

US 2016/0191836 A1  Jun. 30, 2016

(30) Foreign Application Priority Data

Dec. 30, 2014 (TW) .............................. 103146388 A (51) Int. Cl.
*H04N 5/44* (2011.01)
*H04N 5/775* (2006.01)
*H04N 5/63* (2006.01)
*G06K 9/00* (2006.01)

(52) U.S. Cl.
CPC ........ *H04N 5/4403* (2013.01); *G06K 9/00281* (2013.01); *G06K 9/00288* (2013.01); *H04N 5/63* (2013.01); *H04N 5/775* (2013.01); *H04N 2005/4407* (2013.01); *H04N 2005/4428* (2013.01); *H04N 2005/4444* (2013.01)

(58) Field of Classification Search
CPC .................. H04N 21/44218; H04N 21/42201
USPC ......... 348/734, 552, 135, 14.04, 14.05, 725; 348/731, 730; 725/10, 12; 340/545.2
See application file for complete search history.

(56) References Cited

U.S. PATENT DOCUMENTS

| 2008/0278583 A1* | 11/2008 | Evenson, II ......... H04N 5/4403 348/164 |
| 2009/0276802 A1* | 11/2009 | Amento ................. G06T 13/40 725/32 |
| 2011/0080529 A1* | 4/2011 | Wong ..................... G06F 3/011 348/734 |
| 2012/0174143 A1* | 7/2012 | Yang .................. H04N 21/4223 725/10 |
| 2013/0022331 A1* | 1/2013 | Wu .......................... H04N 5/76 386/230 |

FOREIGN PATENT DOCUMENTS

| CN | 201219071 Y | 4/2009 |
| CN | 202121698 U | 1/2012 |
| CN | 102572332 A | 7/2012 |
| CN | 103391464 A | 11/2013 |
| CN | 104165065 A | 12/2014 |

* cited by examiner

*Primary Examiner* — Brian Yenke
*Assistant Examiner* — Jean W Desir
(74) *Attorney, Agent, or Firm* — Zhigang Ma (57) ABSTRACT

A smart control device for controlling a television (TV) set includes at least one sensing device and a processor. The sensing device is configured to detect whether a person is in front of the TV set, and generate a first control signal upon determining that at least one person is in front of the TV set, or generate a second control signal upon determining that no people are in front of the TV set. The processor obtains the control signal generated by the sensing device, and turns on the TV set when the control signal is the first control signal and if the TV set was turned off, or turns off the TV set after a first predetermined time period elapsed, when the control signal is the second control signal and if the TV set was turned on.

16 Claims, 6 Drawing Sheets

SMART CONTROL DEVICE AND METHOD FOR CONTROLLING TELEVISION SET

CROSS-REFERENCE TO RELATED APPLICATIONS

This application claims priority to Taiwanese Patent Application No. 103146388 filed on Dec. 30, 2014, the contents of which are incorporated by reference herein.

FIELD

The subject matter herein generally relates to television (TV) control, and particularly to a smart control device and a smart control method for controlling a TV set.

BACKGROUND

Existing TV sets are usually controlled manually by a user pressing buttons arranged on a remote control or on a shell of the TV set.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. The present disclosure, including the accompanying drawings, is illustrated by way of examples and not by way of limitation.

Several definitions that apply throughout this disclosure will now be presented.

References to "a/an" or "one" embodiment in this disclosure are not necessarily to the same embodiment, and such references mean "at least one." The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected. The term "module" refers to logic embodied in hardware or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
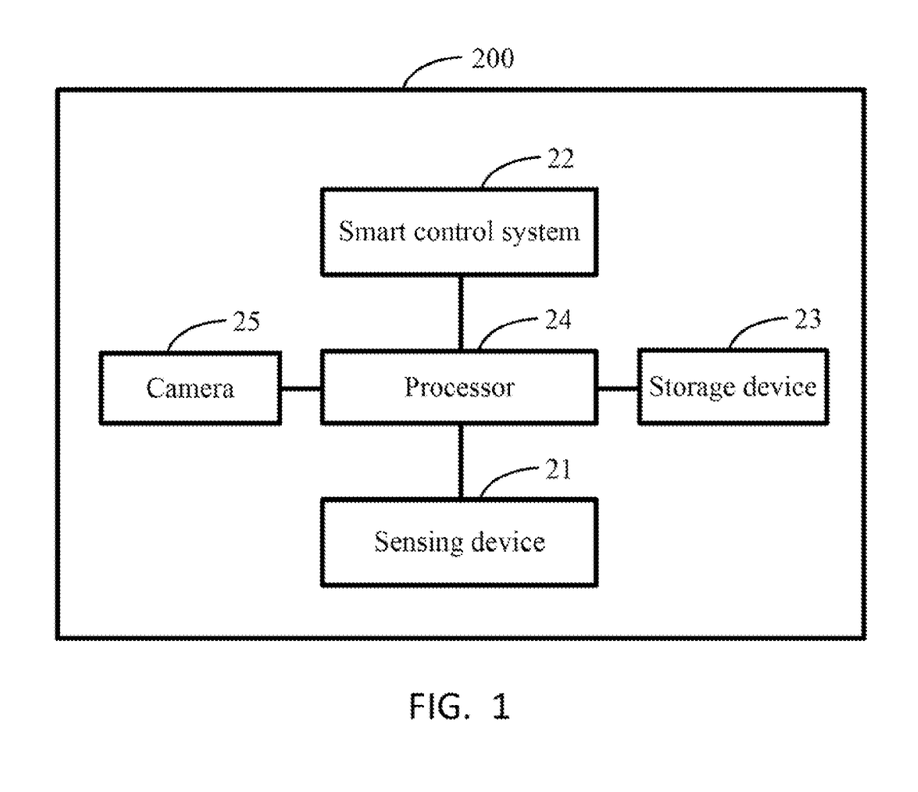
FIG. 1 is a block diagram of one embodiment of a smart control device including a smart control system for controlling a TV set.

FIG. 1 is a block diagram of one embodiment of a smart control device for controlling a TV set. In at least one embodiment as shown in FIG. 1, a smart control device 200 includes, but is not limited to at least one sensing device 21, a smart control system 22, a storage device 23, and at least one processor 24. The at least one processor 24 is coupled to the sensing device 21, the smart control system 22, and the storage device 23. FIG. 1 illustrates only one example of the smart control device 200, other examples can comprise more or fewer components than illustrated, or have a different configuration of the various components.

In one embodiment, the sensing device 21 is configured to detect whether a person is in front of a TV set 100, and generate a first control signal upon determining that at least one person is in front of the TV set 100, or generate a second control signal upon determining that no people are in front of the TV set 100.

The storage device 23 can be an internal storage device, such as a flash memory, a random access memory (RAM) for temporary storage of information, and/or a read-only memory (ROM) for permanent storage of information. The storage device 23 can also be an external storage device, such as an external hard disk, a storage card, or a data storage medium. The at least one processor 24 can be a central processing unit (CPU), a microprocessor, or other data processor chip that performs functions of the smart control device 200.

Figure 2:
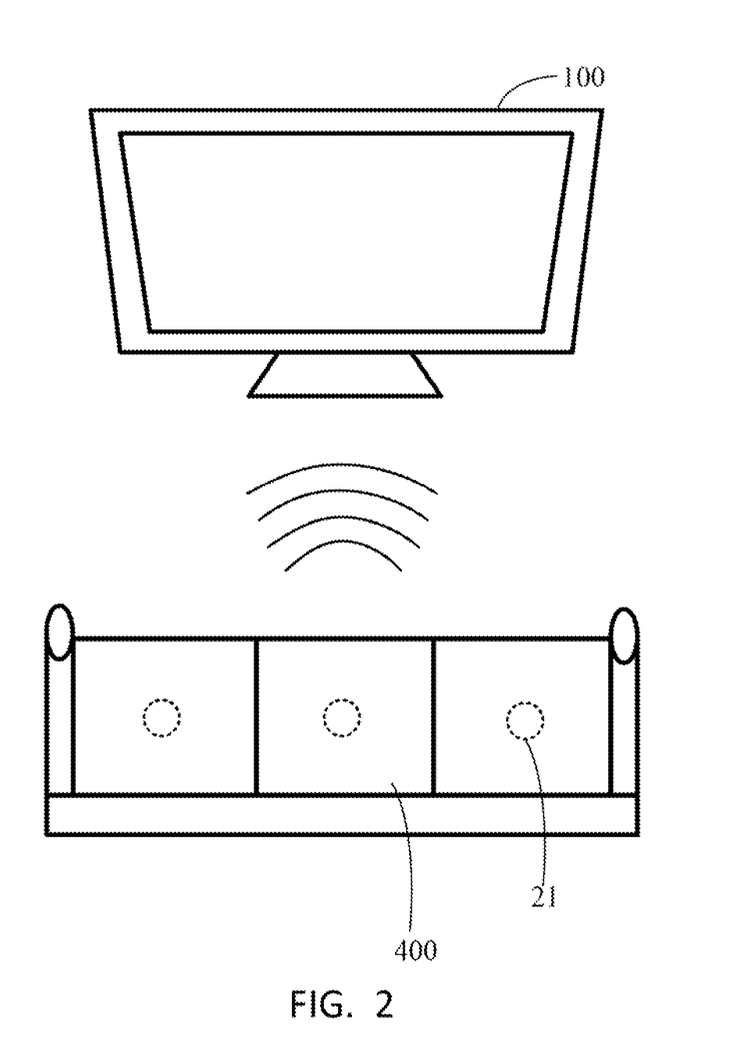
FIG. 2 is a diagrammatic view of one example embodiment of a smart control device for controlling a TV set.

In one embodiment, the smart control device 200 can be an independent device, and the sensing device 21 can be mounted on a sofa or a chair 400 (as shown in FIG. 2) which is located in front of the TV set 100.

In one embodiment, the sensing device 21 can be a pressure sensor. When a person sits on the sofa or the chair 400, the sensing device 21 senses pressure and generates the first control signal. When no people sit on the sofa or the chair 400, the sensing device 21 senses no pressure and generates the second control signal.

In other embodiments, the sensing device 21 can be a light sensor. When a person sits on the sofa or the chair 400 to block light from entering the sensing device 21, the sensing device 21 receives no light and generates the first control signal. When no people sit on the sofa or the chair 400, the sensing device 21 receives light and generates the second control signal.

Figure 3:
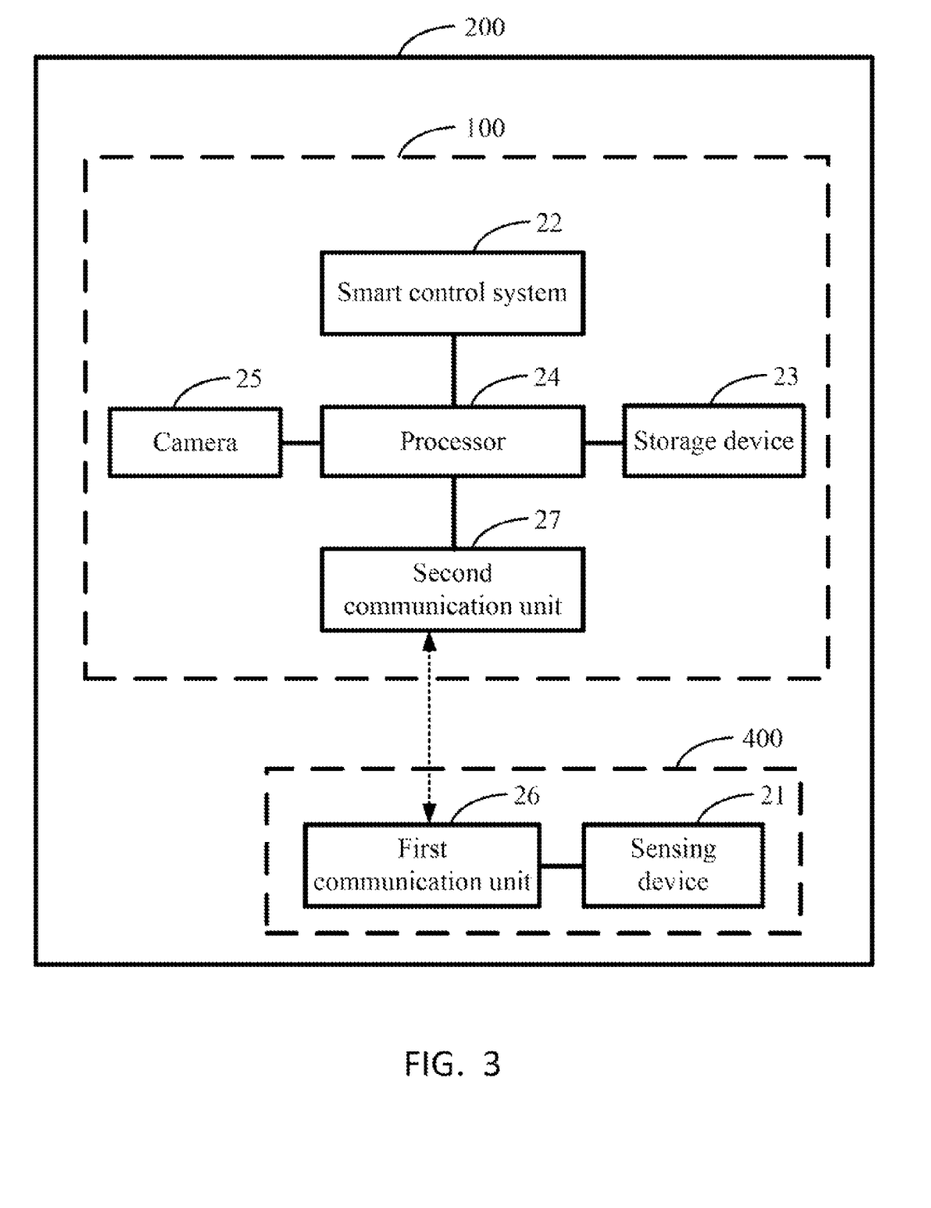
FIG. 3 is a block diagram of another embodiment of a smart control device including a smart control system for controlling a TV set.

In other embodiments, such as shown in FIG. 3, the sensing device 21 can be mounted on a sofa or a chair 400 which is located in front of the TV set 100, and the storage device 23 and the processor 24 can be built into the TV set 100. In the other embodiments, the smart control device 200 further includes a first communication unit 26 which is mounted on the sofa or the chair 400 and is coupled to the sensing device 21, and a second communication unit 27 which is built into the TV set 100 and is coupled to the processor 23 and the first communication unit 26.

In other embodiments, each of the first communication unit 26 and the second communication unit 27 can be a WIFI device, BLUETOOTH device, infrared device, ZEGBEE device, or Z-WAVE device, and the first communication unit 26 and the second communication unit 27 can communicate with each other through wireless technology, such as WIFI, BLUETOOTH, infrared, ZEGBEE, or Z-WAVE technology. The first communication unit 26 is configured to transmit the control signal generated by the sensing device 21 to the processor 21 through the second communication unit 27.

In one embodiment, the smart control system 22 can turn on or turn off the TV set 100 according to the control signal generated by the sensing device 21.

Figure 4:
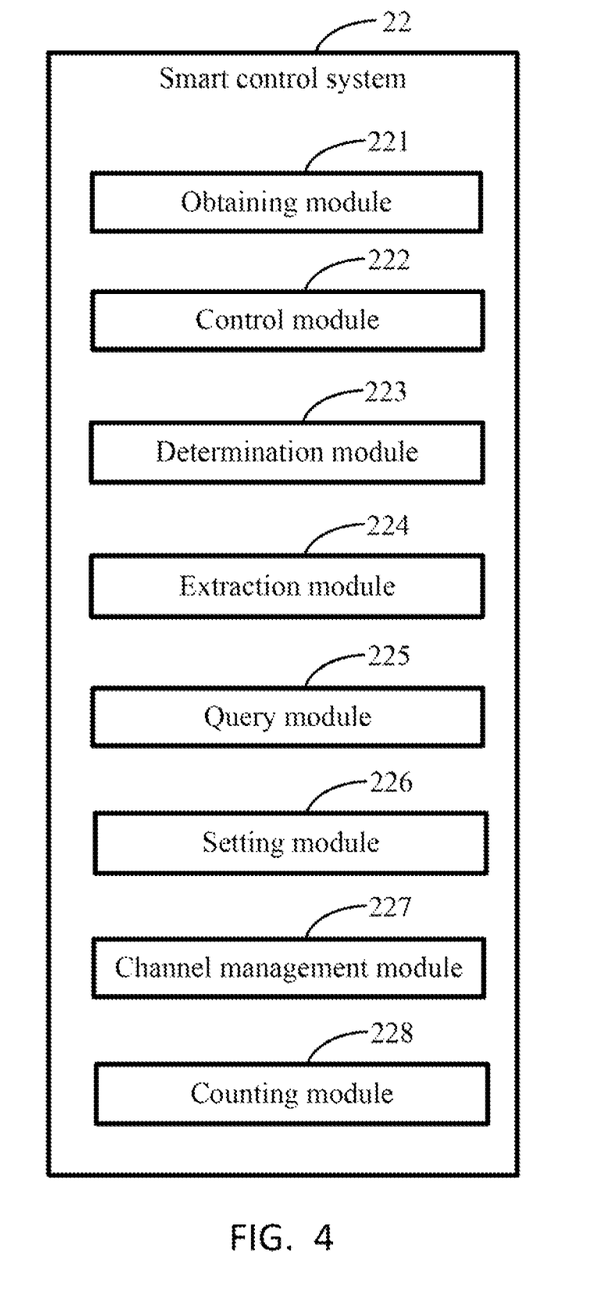
FIG. 4 is a block diagram of one embodiment of function modules of the smart control system in the smart control device of FIG. 1.

FIG. 4 shows that, in at least one embodiment, the smart control system 22 can include an obtaining module 221, a control module 222, and a determination module 223. Modules 221-223 can comprise computerized instructions in the form of one or more computer-readable programs that can be stored in a non-transitory computer-readable medium, for example in the storage device 23, and are executed by the at least one processor 24 of the smart control device 200 to provide functions of the present disclosure.

In the embodiment, the obtaining module 221 obtains the control signal generated by the sensing device 21. The determination module 223 determines whether the control signal is a first control signal or is a second control signal. The control module 222 turns on the TV set 100 when the control signal is a first control signal and if the TV set 100 was turned off. The control module 222 turns off the TV set 100 after a first predetermined time period, such as ten minutes elapses, when the control signal is a second control signal and if the TV set 100 was turned on. With such configuration, if the user leaves for a short time, such as no longer than ten minutes, the TV set 100 will not be turned off, but if the user leaves for a long time, such as longer than ten minutes, the TV set 100 will be turned off automatically by the smart control system.

In one embodiment, the smart control device 200 further includes a camera 25 which can be mounted on a shell of the TV set 100 and is coupled to the processor 24. The smart control system 22 further includes an extraction module 224, a query module 225, a setting module 226, a channel management module 227, and a counting module 228. Modules 224-228 can comprise computerized instructions in the form of one or more computer-readable programs that can be stored in a non-transitory computer-readable medium, for example in the storage device 23, and are executed by the at least one processor 24 of the smart control device 200 to provide functions of the present disclosure.

In one embodiment, the setting module 226 presets a number of user information lists and stores the number of user information lists in the storage device 23. In one embodiment, each user information list records facial features of a user and a viewing history list of the user, the viewing history list records a number of viewing histories each corresponding to a number of time periods within a predetermined time cycle, such as a month, and each viewing history records a relationship between a number of TV channels which have been viewed by the corresponding user at a corresponding time period within the predetermined time cycle and viewing times of the TV channels.

In one embodiment, the control module 222 controls the camera 25 to capture a picture of an area in front of the TV set 100 at a preset frequency when the TV set 100 is turned on, the obtaining module 221 obtains the picture captured by the camera 25, and the extraction module 223 extracts facial features from the obtained picture.

The query module 225 queries the prestored user information lists to obtain a viewing history list of a target user according to the facial features. The determination module 223 determines a current time period and determines a target TV channel which has been viewed most frequently by the target user at the current time period based on the viewing history list of the target user. The channel management module 227 switches a current TV channel playing on the TV set 100 to the target TV channel.

For example, user A normally views the News channel at 6:00 pm-8:00 pm, and views finance channel between 8:00 pm-10:00 pm, when user A sits at front of the TV set 100 at 9:00 pm, the TV set 100 will be turned on and play the finance channel automatically. If user just wants to rest in front of the TV set 100 but does not want to watch TV, or he or she wants to view other TV channels, he or she can manually control the TV set using a remote control (not shown).

In one embodiment, the setting module 226 further sets a priority list which defines a relationship between facial features of a number of users and a number of priorities of using the TV set 100.

The determination module 223 further determines whether facial features of more than two users are extracted from the obtained picture. Upon the determination module 223 determining that facial features of more than two users are extracted from the obtained picture, the query module 225 queries the priority list to determine a chief user who has a higher priority than other users to use the TV set according to the extracted facial features. The channel management module 227 switches the current TV channel playing on the TV set 100 to a new TV channel which has been viewed most frequently by the chief user at the current time period.

For example, user B normally views the shopping channel at 8:00 pm-10:00 pm, and user C normally views the cartoon channel between 8:00 pm-10:00 pm, and user A has a highest priority to use the TV set 100, and user C has a lowest priority. When all of the users A, B, and C sit at front of the TV set 100 at 8:00 pm, then the user A is determined to be the chief user, and the TV set 100 will be turned on and play the finance channel automatically. If the user C does not want to watch the finance channel, user C can switch the finance channel to other channels, such as the cartoon channel.

In other embodiments, the determination module 223 determines the user who sits in the middle of all of the users to be the chief user.

In the embodiment, the counting module 228 adds one time to the viewing times of a currently playing TV channel viewed by the target user at the current time period when a duration of playing the currently playing TV channel is greater than a second predetermined time period, such as fifteen minutes, and updates the viewing times of the currently playing TV channel in corresponding viewing history list.

With such a configuration, the smart control device 200 can smartly control the TV set 100, based on monitoring of an area in front of the TV set 100 and obtaining information of the user who is in front of the TV set 100.

Figure 5:
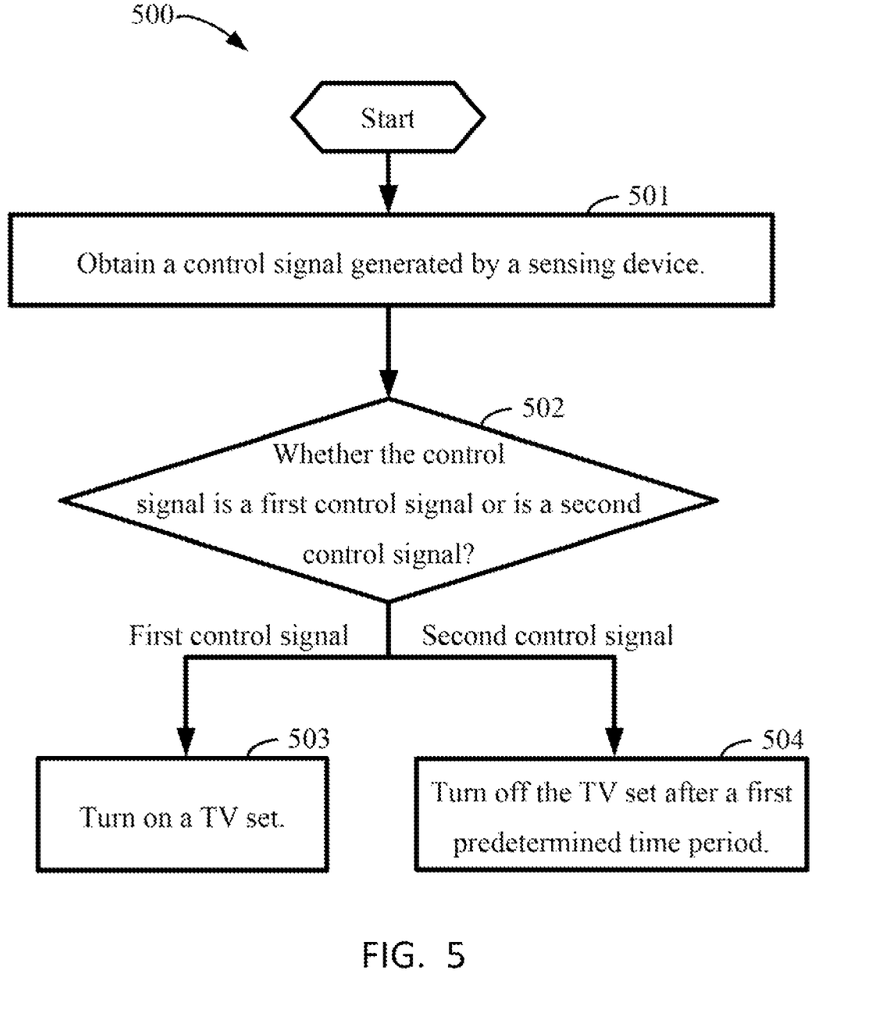
FIG. 5 is a flowchart of one embodiment of a method for controlling a TV set.

FIG. 5 illustrates a flowchart of an example embodiment of a method for controlling a TV set executed in a smart control device. In an example embodiment, the method 500 is performed by execution of computer-readable software program codes or instructions by at least one processor of the smart control device.

Referring to FIG. 5, the flowchart is presented in accordance with an example embodiment which is thus illustrated. The example method 500 is provided by way of example, as there are a variety of ways to carry out the method. The method 500 described below can be carried out using the configurations illustrated in FIGS. 1-4, for example, and various elements of these figures are referenced in explaining method 500. Each block shown in FIG. 5 represents one or more processes, methods, or subroutines, carried out in the exemplary method 500. Furthermore, the illustrated order of blocks is by example only and the order of the blocks can change. Additional blocks can be added or fewer blocks can be utilized without departing from this disclosure. The example method 500 can begin at block 501.

At block 501, an obtaining module obtains a control signal generated by a sensing device. In the embodiment, the sensing device is configured to detect whether a person is in front of a TV set, and generate a first control signal upon determining that at least one person is in front of the TV set, and generate a second control signal upon determining that no people are in front of the TV set.

At block 502, a determination module determines whether the control signal is a first control signal or is a second control signal. Upon determining that the control signal is a first control signal, the block 503 is implemented, or upon determining that the control signal is a second control signal, the block 504 is implemented.

At block 503, a control module turns on the TV set if the TV set was turned off.

At block 504, the control module turns off the TV set after a first predetermined time period, such as ten minutes elapses, if the TV set was turned on.

Figure 6:
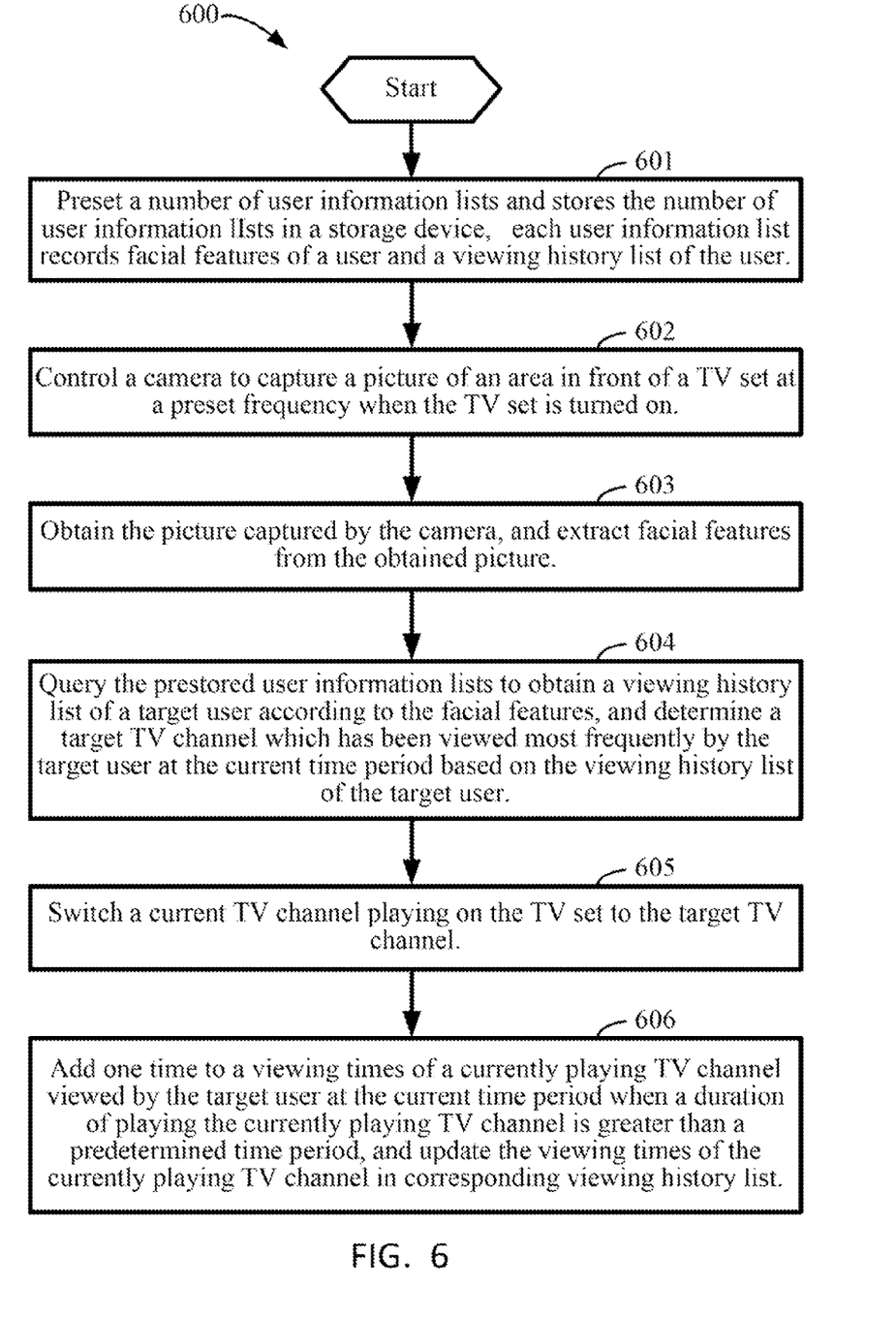
FIG. 6 is a flowchart of another embodiment of a method for controlling a TV set.

FIG. 6 illustrates a flowchart of another example embodiment of a method for controlling a TV set executed in a smart control device. In an example embodiment, the method 600 is performed by execution of computer-readable software program codes or instructions by at least one processor of the smart control device. The example method 600 can begin at block 601.

At block 601, a setting module presets a number of user information lists and stores the number of user information lists in a storage device. In one embodiment, each user information list records facial features of a user and a viewing history list of the user, the viewing history list records a number of viewing histories each corresponding to a number of time periods within a predetermined time cycle, such as a month, and each viewing history records a relationship between a number of TV channels which have been viewed by the corresponding user at a corresponding time period within the predetermined time cycle and viewing times of the TV channels.

At block 602, a control module controls a camera to capture a picture of an area in front of the TV set at a preset frequency when the TV set is turned on.

At block 603, an obtaining module obtains the picture captured by the camera, and an extraction module extracts facial features from the obtained picture.

At block 604, a query module queries the prestored user information lists to obtain a viewing history list of a target user according to the facial features, and a determination module determines a current time period and determines a target TV channel which has been viewed most frequently by the target user at the current time period based on the viewing history list of the target user.

At block 605, a channel management module switches a current TV channel playing on the TV set to the target TV channel.

For example, user A normally views the News channel at 6:00 pm-8:00 pm, and views the finance channel between 8:00 pm-10:00 pm, when user A sits at front of the TV set at 9:00 pm, the TV set will be turned on and play the finance channel automatically.

In one embodiment, the setting module further sets a priority list which defines a relationship between facial features of a number of users and a number of priorities of using the TV set.

The determination module further determines whether facial features of more than two users are extracted from the obtained picture. Upon the determination module determining that facial features of more than two users are extracted from the obtained picture, the query module queries the priority list to determine a chief user who has a higher priority than other users to use the TV set according to the extracted facial features. The channel management module switches the current TV channel playing on the TV set to a new TV channel which has been viewed most frequently by the chief user at the current time period.

For example, user B normally views the shopping channel at 8:00 pm-10:00 pm, and user C normally views the cartoon channel between 8:00 pm-10:00 pm, and user A has a highest priority to use the TV set, and user C has a lowest priority. When all of the users A, B, and C sit at front of the TV set at 8:00 pm, then the user A is determined to be the chief user, and the TV set will be turned on and play the finance channel automatically. If one of the users, such as the user C does not want to watch the finance channel, user C can switch the finance channel to other channels, such as the cartoon channel.

In other embodiments, the determination module determines the user who sits in the middle of all of the users to be the chief user.

At block 606, a counting module adds one time to the viewing times of a currently playing TV channel viewed by the target user at the current time period when a duration of playing the currently playing TV channel is greater than a second predetermined time period, such as fifteen minutes, and updates the viewing times of the currently playing TV channel in corresponding viewing history list.

With such a configuration, the smart control device 200 can smartly control the TV set 100, based on monitoring an area in front of the TV set 100 and obtaining information of user who is in front of the TV set 100.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. A smart control device for controlling a television (TV) set, comprising:

at least one sensing device configured to detect whether a person is in front of the TV set, the sensing device being mounted on a sofa or a chair which is located in front of the TV set, the sensing device generating a first control signal upon determining that at least one person is in front of the TV set, or generating a second control signal upon determining that no people are in front of the TV set;

at least one processor coupled to the sensing device;

a camera coupled to the at least one processor;

a non-transitory storage device coupled to the processor, the storage device storing one or more programs, which upon execution by the processor, cause the processor to:

obtain the control signal generated by the sensing device;

determine whether the control signal is a first control signal or is a second control signal; and turn on the TV set when the control signal is the first control signal and if the TV set was turned off; or turn off the TV set after a first predetermined time period elapsed, when the control signal is the second control signal and if the TV set was turned on;

set a plurality of user information lists and prestore the plurality of user information lists in the storage device;

control the camera to capture a picture of an area in front of the TV set at a preset frequency when the TV set is turned on;

obtain the picture captured by the camera, and extract facial features from the obtained picture;

query the prestored user information lists to obtain a viewing history list of a target user according to the facial features, and determine a current time period and determine a target TV channel which has been viewed most frequently by the target user at the current time period based on the viewing history list of the target user; and switch a current TV channel playing on the TV set to the target TV channel.

2. The smart control device as described in claim 1, wherein the sensing device is a pressure sensor, when a person sits on the sofa or the chair, the sensing device senses pressure and generates the first control signal; when no people sit on the sofa or the chair, the sensing device senses no pressure and generates the second control signal.

3. The smart control device as described in claim 1, wherein the sensing device is a light sensor, when a person sits on the sofa or the chair to block light from entering the sensing device, the sensing device receives no light and generates the first control signal; when no people sit on the sofa or the chair, the sensing device receives light and generates the second control signal.

4. The smart control device as described in claim 1, further comprising a first communication unit which is mounted on the sofa or the chair and is coupled to the sensing device, and a second communication unit which is coupled to the processor and the first communication unit, wherein the processor and the second communication unit are built into the TV set.

5. The smart control device as described in claim 4, wherein the first communication unit and the second communication unit communicate with each other through wireless technology, and the first communication unit is configured to transmit the control signal generated by the sensing device to the processor through the second communication unit.

6. The smart control device as described in claim 1, wherein each user information list records facial features of a user and a viewing history list of the user, the viewing history list records a plurality of viewing histories each corresponding to a plurality of time periods within a predetermined time cycle, and each viewing history records a relationship between a plurality of TV channels which have been viewed by the corresponding user at a corresponding time period within the predetermined time cycle and viewing times of the TV channels.

7. The smart control device as described in claim 6, wherein the processor further adds one time to the viewing times of a currently playing TV channel viewed by the target user at the current time period when a duration of playing the currently playing TV channel is greater than a second predetermined time period, and updates the viewing times of the currently playing TV channel in corresponding viewing history list.

8. The smart control device as described in claim 7, wherein the processor further:

determines whether facial features of more than two users are extracted from the obtained picture;

upon determining that facial features of more than two users are extracted from the obtained picture, determine a chief user who has a higher priority than other users to use the TV set according to the extracted facial features; and switches the current TV channel playing on the TV set to a new TV channel which has been viewed most frequently by the chief user at the current time period.

9. The smart control device as described in claim 8, wherein the processor further:

sets a priority list which defines a relationship between facial features of a plurality of users and a plurality of priorities of using the TV set; and queries the priority list to determine the chief user.

10. A computer-implemented method for controlling a TV set being executed by a processor of a smart control device, the method comprising:

obtaining a control signal generated by a sensing device, wherein the sensing device is configured to detect whether a person is in front of the TV set, and generate a first control signal upon determining that at least one person is in front of the TV set, or generate a second control signal upon determining that no people are in front of the TV set;

determining whether the control signal is a first control signal or is a second control signal;

turning on the TV set when the control signal is the first control signal and if the TV set was turned off; or turning off the TV set after a first predetermined time period elapsed, when the control signal is the second control signal and if the TV set was turned on;

setting a plurality of user information lists and prestoring the plurality of user information lists in a storage device;

controlling a camera to capture a picture of an area in front of the TV set at a preset frequency when the TV set is turned on;

obtaining the picture captured by the camera, and extracting facial features from the obtained picture;

querying the prestored user information lists to obtain a viewing history list of a target user according to the facial features, and determining a current time period and determining a target TV channel which has been viewed most frequently by the target user at the current time period based on the viewing history list of the target user; and switching a current TV channel playing on the TV set to the target TV channel.

11. The method as described in claim 10, wherein each user information list records facial features of a user and a viewing history list of the user, the viewing history list records a plurality of viewing histories each corresponding to a plurality of time periods within a predetermined time cycle, and each viewing history records a relationship between a plurality of TV channels which have been viewed by the corresponding user at a corresponding time period within the predetermined time cycle and viewing times of the TV channels.

12. The method as described in claim 11, further comprising:
adding one time to the viewing times of a currently playing TV channel viewed by the target user at the current time period when a duration of playing the currently playing TV channel is greater than a second predetermined time period; and
updating the viewing times of the currently playing TV channel in corresponding viewing history list.

13. The method as described in claim 12, further comprising:
determining whether facial features of more than two users are extracted from the obtained picture;
upon determining that facial features of more than two users are extracted from the obtained picture, querying the priority list to determine a chief user who has a higher priority than other users to use the TV set according to the extracted facial features; and
switching the current TV channel playing on the TV set to a new TV channel which has been viewed most frequently by the chief user at the current time period.

14. The method as described in claim 13, further comprising:
setting a priority list which defines a relationship between facial features of a plurality of users and a plurality of priorities of using the TV set;
queries the priority list to determine the chief user.

15. A non-transitory storage medium having stored thereon instructions that, when executed by at least one processor of a smart control device, causing the at least one processor to perform a method for controlling a TV set, the method comprising:
obtaining a control signal generated by a sensing device, wherein the sensing device is configured to detect whether a person is in front of the TV set, and generate a first control signal upon determining that at least one person is in front of the TV set, or generate a second control signal upon determining that no people are in front of the TV set;
determining whether the control signal is a first control signal or is a second control signal;
turning on the TV set when the control signal is the first control signal and if the TV set was turned off; or
turning off the TV set after a first predetermined time period elapsed, when the control signal is the second control signal and if the TV set was turned on;
setting a plurality of user information lists and prestoring the plurality of user information lists in a storage device, wherein each user information list records facial features of a user and a viewing history list of the user, the viewing history list records a plurality of viewing histories each corresponding to a plurality of time periods within a predetermined time cycle, and each viewing history records a relationship between a plurality of TV channels which have been viewed by the corresponding user at a corresponding time period within the predetermined time cycle and viewing times of the TV channels;
controlling a camera to capture a picture of an area in front of the TV set at a preset frequency when the TV set is turned on;
obtaining the picture captured by the camera, and extracting facial features from the obtained picture;
querying the prestored user information lists to obtain a viewing history list of a target user according to the facial features, and determining a current time period and determining a target TV channel which has been viewed most frequently by the target user at the current time period based on the viewing history list of the target user; and
switching a current TV channel playing on the TV set to the target TV channel.

16. The non-transitory storage medium as described in claim 15, wherein the method further comprises:
setting a priority list which defines a relationship between facial features of a plurality of users and a plurality of priorities of using the TV set;
determining whether facial features of more than two users are extracted from the obtained picture;
upon determining that facial features of more than two users are extracted from the obtained picture, querying the priority list to determine a chief user who has a higher priority than other users to use the TV set according to the extracted facial features; and
switching the current TV channel playing on the TV set to a new TV channel which has been viewed most frequently by the chief user at the current time period.

* * * * *